US012691782B2

(12) United States Patent　　(10) Patent No.: US 12,691,782 B2
Yamauchi et al.　　(45) Date of Patent: *Jul. 28, 2026

(54) POWER SUPPLY/DEMAND ADJUSTING METHOD AND POWER SUPPLY/DEMAND MANAGEMENT DEVICE

(71) Applicant: Prime Planet Energy & Solutions, Inc., Tokyo (JP)

(72) Inventors: Yutaka Yamauchi, Himeji (JP); Jun Asakura, Kakogawa (JP); Hideki Sakata, Nishinomiya (JP); Hideyuki Nagai, Nagoya (JP); Masanori Iechika, Toyota (JP); Yasuhiko Ikeda, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 1023 days.

This patent is subject to a terminal disclaimer.

(21) Appl. No.: 17/863,396

(22) Filed: Jul. 13, 2022

(65) Prior Publication Data

US 2023/0013447 A1　Jan. 19, 2023

(30) Foreign Application Priority Data

Jul. 14, 2021　(JP) ................................. 2021-116394

(51) Int. Cl.
　G06Q 10/0631　(2023.01)
　B60L 53/30　(2019.01)
　(Continued)

(52) U.S. Cl.
　CPC ........... B60L 53/665 (2019.02); B60L 53/305 (2019.02); B60L 53/65 (2019.02);
　(Continued)

(58) Field of Classification Search
None
See application file for complete search history.

(56) References Cited

U.S. PATENT DOCUMENTS

| 10,752,128 | B1 * | 8/2020 | Langton | ................. | B60L 58/16 |
| 2007/0282495 | A1 * | 12/2007 | Kempton | ................. | B60L 8/00 |
| | | | | | 701/22 |

(Continued)

FOREIGN PATENT DOCUMENTS

| CN | 103608992 A | 2/2014 |
| CN | 108376373 A | 8/2018 |

(Continued)

OTHER PUBLICATIONS

M. Sufyan et al., Charge coordination and battery lifecycle analysis of electric vehicles with V2G implementation, Electric Power Systems Research, Mar. 20, 2020, pp. 1-11, vol. 184, 11pp.

(Continued)

*Primary Examiner* — George Chen
(74) *Attorney, Agent, or Firm* — HAUPTMAN HAM, LLP

(57) ABSTRACT

A power supply/demand adjusting method disclosed here is a method for adjusting power supply and demand between a power transmission/distribution system and a storage battery mounted on an electric vehicle. The method includes the steps of: acquiring power selling approval of a storage battery; acquiring battery information of a storage battery for which the power selling approval is acquired based on the acquired power selling approval and power demand information from the power transmission/distribution system; calculating a power selling amount to be transmitted from the storage battery to the power transmission/distribution system, based on the acquired battery information of the storage battery and the acquired power demand information; supplying electric vehicle based on the power selling amount from the storage battery to the power transmission/distribution system; and calculating an incentive to be (Continued)

provided to a user of the electric vehicle based on the power selling amount.

2 Claims, 6 Drawing Sheets

(51) Int. Cl.

| | |
|---|---|
| *B60L 53/65* | (2019.01) |
| *B60L 53/66* | (2019.01) |
| *G06Q 50/06* | (2024.01) |
| *H02J 3/32* | (2026.01) |
| *H02J 7/82* | (2026.01) |
| *H02J 7/84* | (2026.01) |

(52) U.S. Cl.
CPC ....... *G06Q 10/06315* (2013.01); *G06Q 50/06* (2013.01); *H02J 3/322* (2020.01); *H02J 7/82* (2026.01); *H02J 7/84* (2026.01)

(56) References Cited

U.S. PATENT DOCUMENTS

| | | | |
|---|---|---|---|
| 2008/0039980 A1* | 2/2008 | Pollack | B60L 53/68 700/295 |
| 2011/0078092 A1 | 3/2011 | Kim et al. | |
| 2011/0208637 A1 | 8/2011 | Wakita et al. | |
| 2012/0150709 A1 | 6/2012 | Kaji | |
| 2012/0249068 A1 | 10/2012 | Ishida | |
| 2014/0117933 A1 | 5/2014 | Nyu | |
| 2014/0379159 A1 | 12/2014 | Kitagishi | |
| 2017/0267115 A1 | 9/2017 | Unno et al. | |
| 2018/0218459 A1 | 8/2018 | Yokoyama et al. | |
| 2019/0386511 A1 | 12/2019 | Takahashi et al. | |
| 2020/0091752 A1 | 3/2020 | Esaka et al. | |
| 2020/0269721 A1* | 8/2020 | Vidhi | B60L 55/00 |
| 2020/0353839 A1 | 11/2020 | Tarchinski et al. | |
| 2021/0135484 A1 | 5/2021 | Waite | |
| 2021/0170903 A1 | 6/2021 | Tsuchiya et al. | |
| 2021/0255251 A1 | 8/2021 | Ukumori | |
| 2022/0297568 A1 | 9/2022 | Kinomura | |
| 2023/0116812 A1 | 4/2023 | Yamauchi et al. | |

FOREIGN PATENT DOCUMENTS

| | | |
|---|---|---|
| CN | 110239382 A | 9/2019 |
| CN | 110896216 A | 3/2020 |
| JP | 2011-175556 A | 9/2011 |
| JP | 5529894 B2 | 6/2014 |
| JP | 2015186290 A | 10/2015 |
| JP | 2017127085 A | 7/2017 |
| JP | 2018-161023 A | 10/2018 |
| JP | 2018207590 A | 12/2018 |
| JP | 6590029 B1 | 10/2019 |
| JP | 2020-42686 A | 3/2020 |
| JP | 6783190 B2 | 11/2020 |
| JP | 2021-093802 A | 6/2021 |
| KR | 1020160037323 A | 4/2016 |
| WO | 2012/004897 A1 | 1/2012 |
| WO | 2018180438 A1 | 10/2018 |
| WO | 2019/215817 A1 | 11/2019 |

OTHER PUBLICATIONS

Office Action in U.S. Appl. No. 17/862,404 dated Mar. 27, 2023, 33pp.

* cited by examiner

POWER SUPPLY/DEMAND ADJUSTING METHOD AND POWER SUPPLY/DEMAND MANAGEMENT DEVICE

CROSS REFERENCE TO RELATED APPLICATIONS

This application claims the benefit of priority to Japanese Patent No. 2021-116394 filed on Jul. 14, 2021. The entire contents of this application are hereby incorporated herein by reference.

BACKGROUND

The technique disclosed here relates to a power supply/demand adjusting method and a power supply/demand management device used in the power supply/demand adjusting method.

In recent years, there has been proposed a technique for adjusting power supply and demand with which a general user is participate in adjusting a power supply/demand balance in a power transmission/distribution system managed by, for example, an electric power company, and in return, the user receives an incentive (e.g., money or points). In this method for adjusting power supply and demand, when power shortage occurs in the power transmission/distribution system, a request for power supply is issued to a user having a large-size storage battery capable of being repeatedly charged and discharged. If the user accepts the request, the user connects his/her storage battery to a power supply/demand management device, and supplies electric power to the power transmission/distribution system through the power supply/demand management device. Then, the power supply/demand management device provides the user with an incentive according to the supplied electric power. An example of the power supply/demand management device for use in the method for adjusting power supply and demand is disclosed in JP2020-42686A. A series of processes concerning power supply and incentive grant will be hereinafter referred to as a "power selling process."

A power supply/demand management device described in JP2020-42686A includes a state information acquisition controller for acquiring state information indicating a current state of a storage battery, a performance calculation controller for calculating a performance index (the degree of deterioration of the storage battery) indicating a consumption degree of a storage battery from the state information, and an incentive imparting controller for imparting an incentive according to a value of the performance index to a provider who provides a storage battery as a power demand/supply adjustment means of a power transmission/distribution system. In this power supply/demand management device, a high incentive is imparted to a user having a storage battery showing a high deterioration degree. This encourages a user who hesitates to perform a power selling process because of deterioration of a storage battery to participate in power supply/demand adjustment. The power supply/demand management device of JP2020-42686A notifies a communication terminal or the like of a user of an incentive that can be provided by participation in a power selling process before a storage battery of the user is actually used as a power demand/supply adjustment means. The user can determine whether to participate in the power selling process based on the notification.

However, a user who already has an intention to participate in a power selling process might feel bothered to check the notification and determine whether to participate in the power selling process, and reduce willingness to participation in the power selling process in some cases. In view of this, a power supply/demand management device is also proposed to appropriately perform a power selling process as necessary with prior approval of a user in selling electric power. Japanese Patent No. 6783190, for example, discloses a power supply/demand management device that performs a power selling process at a timing profitable for a user with prior approval of the user. Japanese Patent No. 6783190 describes that a reward price obtained by participating in a power selling process of a storage battery and a buying price based on deterioration of the battery are compared and, when the reward price is lower than a reduced price of the buying price, the power selling process is automatically conducted.

SUMMARY

As described above, with the technique described in Japanese Patent No. 6783190, a power selling process can be automatically performed to obtain a favorable profit without user's intervention. The technique of Japanese Patent No. 6783190, however, performs a power selling process at occurrence of a financial benefit, and thus, an influence on the state of a storage battery caused by the power selling process is not taken into consideration. Accordingly, in a storage battery used as a driving source of, for example, an electric vehicle, a power selling process is performed only from the viewpoint of the financial benefit, resulting in the possibility that the state of the storage battery excessively deteriorates to adversely affect safety and other aspects. Such influence on the state of the storage battery is a concern for a user of, for example, an electric vehicle, and can cause hesitation in participating in a power supply/demand adjustment.

It is therefore an object of the technique disclosed here to provide a method for eliminating concerns of a user and encouraging participation in power supply/demand adjustment by performing a power selling process depending on the state of a storage battery.

To solve the problems described above, the technique disclosed here provides the following power supply/demand adjusting method. A power supply/demand adjusting method disclosed here is a method for adjusting power supply and demand between a power transmission/distribution system and a storage battery mounted on an electric vehicle, and includes the steps of: acquiring power selling approval of electric power stored in the storage battery; acquiring battery information of a storage battery for which the power selling approval is acquired and the power demand information from the power transmission/distribution system based on the acquired power selling approval, the battery information of the storage battery including at least a state of charge and battery health of the storage battery for which the power selling approval is acquired; calculating a power selling amount to be supplied from the storage battery to the power transmission/distribution system, based on the acquired battery information of the storage battery and the acquired power demand information; transmitting electric power based on the power selling amount from the storage battery to the power transmission/distribution system; and calculating an incentive to be provided to a user of the electric vehicle based on the power selling amount.

With this power supply/demand adjusting method, battery information (state of charge and battery health) and power demand information of a storage battery are acquired based on power selling approval of the storage battery, and based on this information, an appropriate power selling amount is calculated. Then, the calculated power selling amount is automatically received from the storage battery and transmitted to the power transmission/distribution system. This power supply/demand adjusting method eliminates user's inconvenience of monitoring information on power selling and determining whether the to participate in power supply/demand adjustment. In addition, since the power selling process is performed in consideration of the state of each storage battery, concerns about, for example, excessive deterioration of the storage battery can be eliminated. Accordingly, participation of a user in power supply/demand adjustment can be encouraged.

In one aspect of the power supply/demand adjusting method disclosed here, in the step of calculating the power selling amount, each of the state of charge and the battery health of a storage battery for which the power selling approval is acquired is compared with a predetermined threshold, and if at least one of the state of charge or the battery health of the storage battery is less than the threshold, the power selling amount is calculated to be zero.

With this method, in a case where the state of the storage battery excessively deteriorates because of a power selling process and the storage battery is used as a driving source of an electric vehicle, a power selling process that adversely affects safety, for example, is stopped. Accordingly, concerns of a user about incapability of using an electric vehicle because of the power selling process is eliminated so that participation in power supply/demand adjustment is encouraged.

In one aspect of the power supply/demand adjusting method disclose here, the method further includes the step of comparing the calculated power selling amount with a predetermined threshold for the power selling amount after the step of calculating the power selling amount. If the calculated power selling amount exceeds the threshold for the power selling amount, the calculated power selling amount may be reduced to at least to the threshold.

This method can prevent supply of excessive electric power from the storage battery. Accordingly, a concern about rapid deterioration of the storage battery is eliminated so that participation of a user in power supply/demand adjustment can be encouraged.

In one aspect of the power supply/demand adjusting method disclosed here, in the step of acquiring the power selling approval, a power selling condition set by a user of the electric vehicle is acquired in addition to the power selling approval. The method may further include the step of determining whether the power selling condition is satisfied or not, after the step of calculating the power selling amount. If the power selling condition is satisfied, electric power based on the calculated power selling amount may be transmitted to the power transmission/distribution system.

In this method, the power selling process is performed based on the power selling condition set by the user. Accordingly, a power selling process not intended by the user is not performed, and thus, participation of the user in power supply/demand adjustment can be encouraged.

In another aspect, a power supply/demand management device disclosed here is provided. The power supply/demand management device disclosed here is a power supply/demand management device configured or programmed to manage power supply and demand between a power transmission/distribution system and a storage battery mounted on an electric vehicle. The power supply/demand management device includes: a power selling information management controller configured or programmed to acquire power selling approval of electric power stored in the storage battery; a battery information acquisition controller configured or programmed to acquire battery information of a storage battery for which the power selling approval is acquired; a power demand information acquisition controller configured or programmed to acquire power demand information from the power transmission/distribution system; a power selling amount management controller configured or programmed to calculate a power selling amount to be supplied from the storage battery to the power transmission/distribution system, based on the battery information acquired by the battery information acquisition controller and the power demand information acquired by the power demand information acquisition controller; a power transmission/reception management controller configured or programmed to transmit electric power based on the power selling amount from the storage battery to the power transmission/distribution system; and an incentive management controller configured or programmed to calculate an incentive to be provided to a user of the electric vehicle based on the power selling amount. The battery information of the storage battery includes at least a state of charge and battery health of a storage battery for which the power selling approval is acquired.

The power supply/demand management device configured as described above acquires battery information (state of charge and battery health) of a storage battery and power demand information based on power selling approval of the storage battery, and calculates an appropriate power selling amount based on the information. Then, the calculated power selling amount is automatically received from the storage battery and transmitted to the power transmission/distribution system. This configuration eliminates inconvenience of determining whether to participate in power supply/demand adjustment and concerns about, for example, excessive deterioration of the storage battery. Accordingly, participation of a user in power supply/demand adjustment can be encouraged.

In one aspect of the power supply/demand management device disclosed here, the power selling amount management controller the power selling amount management controller stores a predetermined threshold for each of the battery health and the state of charge. Each of the battery health and the state of charge of the storage battery acquired by the battery information acquisition controller is compared with the threshold, and if at least one of the battery health or the state of charge of the storage battery is less than the threshold, the power selling amount may be calculated to be zero.

This configuration prevents excessive deterioration of the state of the storage battery to thereby eliminate the user's concern of incapability of using an electric vehicle. Accordingly, participation of a user in power supply/demand adjustment can be encouraged.

In one aspect of the power supply/demand management device disclosed here, the power selling amount management controller stores a predetermined threshold for a power selling amount. The power selling amount calculated by the power selling amount management controller is compared with the threshold for the power selling amount, and if the calculated power selling amount exceeds the threshold for the power selling amount, the calculated power selling amount may be reduced to the threshold.

This configuration prevents selling of an excessive amount of electric power from the storage battery. Accordingly, a concern of a user about rapid deterioration of the storage battery is eliminated so that the user is encouraged to participate in power supply/demand adjustment.

In one aspect of the power supply/demand management device disclosed here, the power selling information management controller acquires a power selling condition set by a user of the electric vehicle in addition to the power selling approval. The power selling amount management controller determines whether the power selling condition is satisfied or not, and if the power selling condition is satisfied, the calculated power selling amount may be transmitted to the power transmission/reception management controller.

With this configuration, the power selling process is performed based on the power selling condition set by the user. Accordingly, the concern of performing a power selling process not intended by the user is eliminated so that the user is encouraged to participate in power supply/demand adjustment.

DETAILED DESCRIPTION

Figure 1:
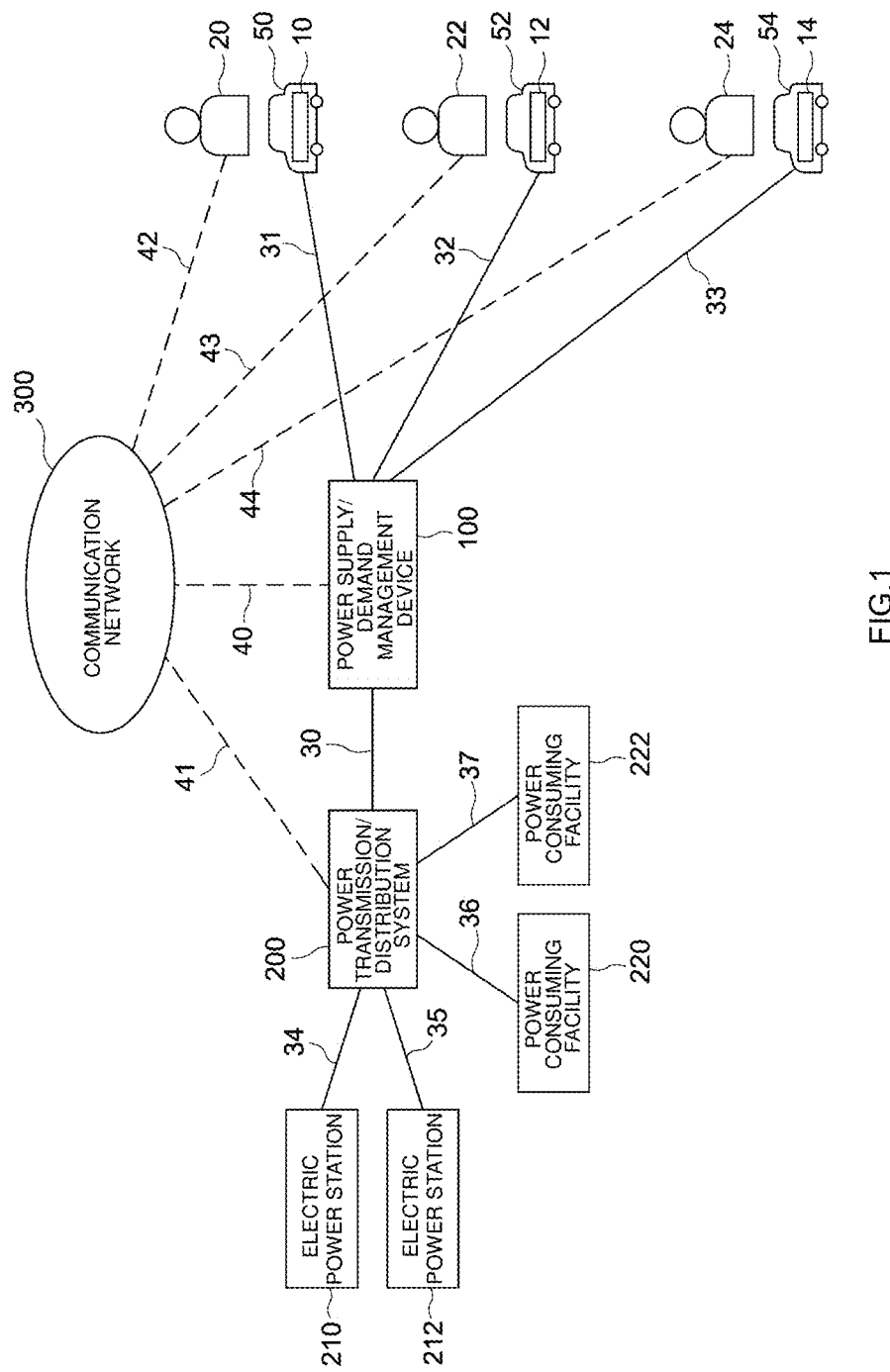
FIG. 1 schematically illustrates an example of application of a power supply/demand management device according to one preferred embodiment.

One preferred embodiment of a power supply/demand adjusting device disclosed here will be described hereinafter with reference to the drawings. Matters not specifically mentioned herein but required for carrying out the present disclosure can be understood as matters of design variation of a person skilled in the art based on related art in the field. An embodiment described here is, of course, not intended to particularly limit the present disclosure. The present disclosure is not limited to the embodiment disclosed here unless otherwise specified.

First, an example of application of a power supply/demand management device 100 disclosed here will be described with reference to FIG. 1. To contribute to stabilization of a power supply balance of a power transmission/distribution system 200, the power supply/demand management device 100 appropriately manages transmission and reception of electric power (hereinafter referred to as power transmission/reception) between storage batteries 10, 12, and 14 mounted on electric vehicles 50, 52, and 54 and the power transmission/distribution system 200. The power supply/demand management device 100 provides incentives (e.g., money and points) according to the supply amount to users 20, 22, and 24 of an electric vehicle participating power supply/demand adjustment and supplied with electric power. The users 20, 22, and 24 of the electric vehicle are provided with incentives according to a supply amount by participating in the power supply/demand adjustment, and thus, have advantages in participating in the power supply/ demand adjustment. This power supply/demand management device 100 is managed by a system manager called an aggregator. To meet a demand from, for example, the power transmission/distribution system 200, the aggregator obtains electric power from, for example, the electric vehicle as described above, and supplies electric power to the power transmission/distribution system 200. Thus, a system manager provides a method of a power selling process for encouraging participation in power supply/demand adjustment in order to obtain a necessary power amount, and manages electric power.

An "incentive" herein is not specifically limited as long as the incentive can be adjusted for each user. The incentive may be money or so-called points exchangeable with products or others.

The "electric vehicle" herein is a type of transport equipment, and may be a four-wheeled vehicle or a two-wheeled vehicle. Examples of the electric vehicle include a battery electric vehicle (BEV) including a storage battery as a driving source and a hybrid electric vehicle (HEV) including a storage battery and an internal combustion engine as a driving source. The "hybrid vehicle" herein includes a plug-in vehicle (PHEV) including a charging system from a stationary power supply to a storage battery. Each of the electric vehicles 50, 52, and 54 preferably includes a communication device enabling bidirectional communication with a communication network 300 and an electronic control controller (ECU) capable of measuring states of charge and battery health of the storage batteries 10, 12, and 14.

The "storage battery" herein refers to a device that stores electric power. The storage battery is capable of supplying stored electric power to an electric vehicle. The storage battery is electrically connected to the power supply/demand management device 100 to thereby supply stored electric power to the power transmission/distribution system 200. Examples of the storage battery include secondary batteries such as a lithium ion secondary battery and a nickel-metal hydride secondary battery, and power storage devices such as an electric double layer capacitor.

The "user" can be an owner of an electric vehicle. The user herein is not limited to an owner of an electric vehicle, and may be any person who can use the electric vehicle, such as a family member of the user. Although FIG. 1 shows three storage batteries, three electric vehicles, and three users, this example is simplified and is not intended to limit the numbers of storage batteries, electric vehicles, and users.

As illustrated in FIG. 1, the power supply/demand management device 100 is connected to the power transmission/distribution system 200 by an electric wire 30 to enable power transmission and reception. The power supply/demand management device 100 is connected to the electric vehicles 50, 52, and 54 as appropriate by electric wires 31, 32, and 33 such that electric power from the storage batteries 10, 12, and 14 mounted on the electric vehicles 50, 52, and 54 can be supplied.

The power transmission/distribution system 200 is connected to electric power stations 210 and 212 by electric wires 34 and 35 to receive electric power from the electric power stations 210 and 212. The electric power stations 210 and 212 include power generation facilities, and are not limited to specific facilities as long as the electric power stations 210 and 212 can supply electric power to the power transmission/distribution system 200. For example, the electric power stations 210 and 212 may be facilities each including a known power generation facility for, for example, thermal power generation, wind power generation, hydroelectric power generation, nuclear power generation, or solar power generation.

The power transmission/distribution system 200 is connected to power consuming facilities 220 and 222 by electric wires 36 and 37 to supply electric power to the power consuming facilities 220 and 222. It is sufficient that the power consuming facilities 220 and 222 are facilities that consume electric power supplied from the power transmission/distribution system 200 and are not limited to specific facilities. Examples of the power consuming facilities include houses, commercial facilities, factories, and schools. Accordingly, the power transmission/distribution system 200 can supply electric power from the electric power stations 210 and 212 to the power consuming facilities 220 and 222.

The communication network 300 may be used for wired communication or wireless communication. Examples of the communication network 300 include communication networks such as the Internet, a cellular phone line, and a local area network (LAN). The power supply/demand management device 100 is connected by communication networks 40, 41, 42, 43, and 44 such that the power supply/demand management device 100 enables bidirectional communication with the power transmission/distribution system 200 and communication terminals (not shown) owned by the users 20, 22, and 24 through the communication network 300. The communication terminals only need to enable bidirectional communication between the users 20, 22, and 24 and each of the power supply/demand management device 100 and the power transmission/distribution system 200 through the communication network 300, and may be, for example, cellular phones, smartphones, tablets, laptop computers, or wearable terminals of the users or may be car navigation systems mounted on the electric vehicles 50, 52, and 54. Each of these communication terminals of the users includes a screen that can display information, an input controller operable by a user for input, such as a touch panel, a keyboard, or a mouse, and a terminal control device.

The configuration illustrated in FIG. 1 is used for a power supply/demand adjusting process between the power transmission/distribution system 200 and the storage batteries 10, 12, and 14 mounted on the electric vehicles 50, 52, and 54 through the power supply/demand management device 100. The power supply/demand adjusting method will be generally described with reference to FIG. 2.

The power supply/demand management device 100 acquires power selling approval of a storage battery from a user who wants to participate in a power selling process (S1). The power supply/demand management device 100 that has acquired power selling approval of the storage battery, acquires battery information of a storage battery for which power selling approval is acquired, and power demand information from the power transmission/distribution system 200 (S2). The battery information includes at least a state of charge and battery health of a storage battery for which power selling approval is acquired. The power supply/demand management device 100 calculates a power selling amount based on the acquired state of charge and battery health of the storage battery and power demand information. Then, electric power based on the power selling amount is supplied from the storage battery to the power transmission/distribution system 200 (S3). The power supply/demand management device 100 provides an incentive according to the power selling amount (S4). Through this process, power supply/demand adjustment (power selling process) is achieved between the power transmission/distribution system 200 and the storage batteries 10, 12, and 14 mounted on the electric vehicles 50, 52, and 54 through the power supply/demand management device 100.

In power supply/demand adjustment using the power supply/demand management device 100 disclosed here, based on acquisition of power selling approval of a storage battery (S1), information necessary for performing a power selling process from each storage battery and the power transmission/distribution system 200 (S2), an appropriate power selling amount is calculated based on the state of the storage battery (e.g., state of charge and battery health) and power demand information, and electric power based on the power selling amount is automatically transmitted from the storage battery to the power transmission/distribution system 200 (S3). This power supply/demand adjusting method eliminates inconvenience of a user in monitoring information concerning power selling such as an incentive and determining whether to participate in power supply/demand adjustment. Since an appropriate power selling amount according to the state of each storage battery is sold, concerns about, for example, excessive deterioration of the storage battery due to participation in power supply/demand adjustment can be eliminated. Accordingly, the user can be encouraged to participate in power supply/demand adjustment.

Figure 2:
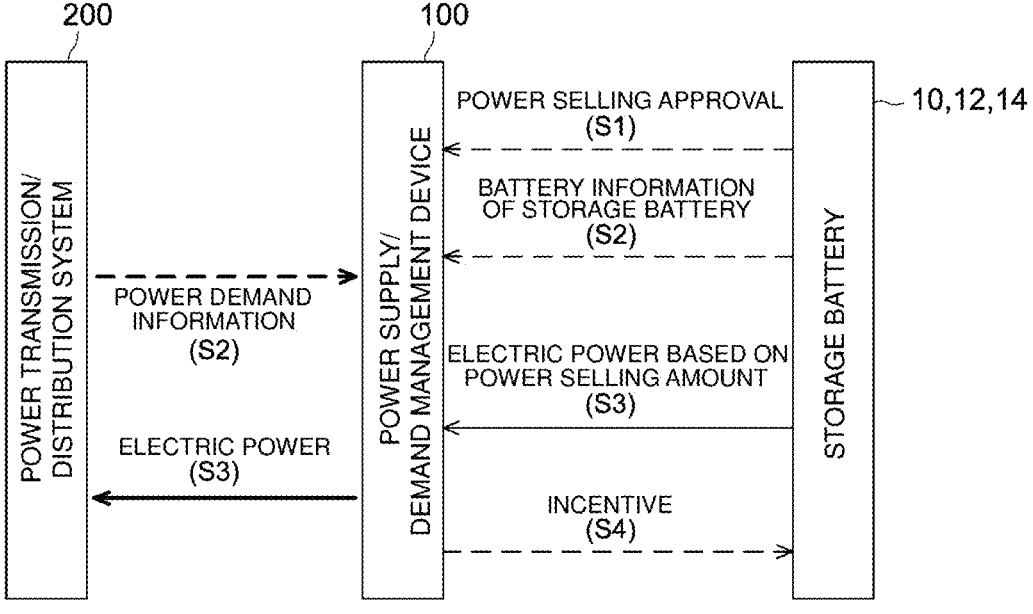
FIG. 2 generally illustrates a power supply/demand adjusting method according to one preferred embodiment.
Figure 3:
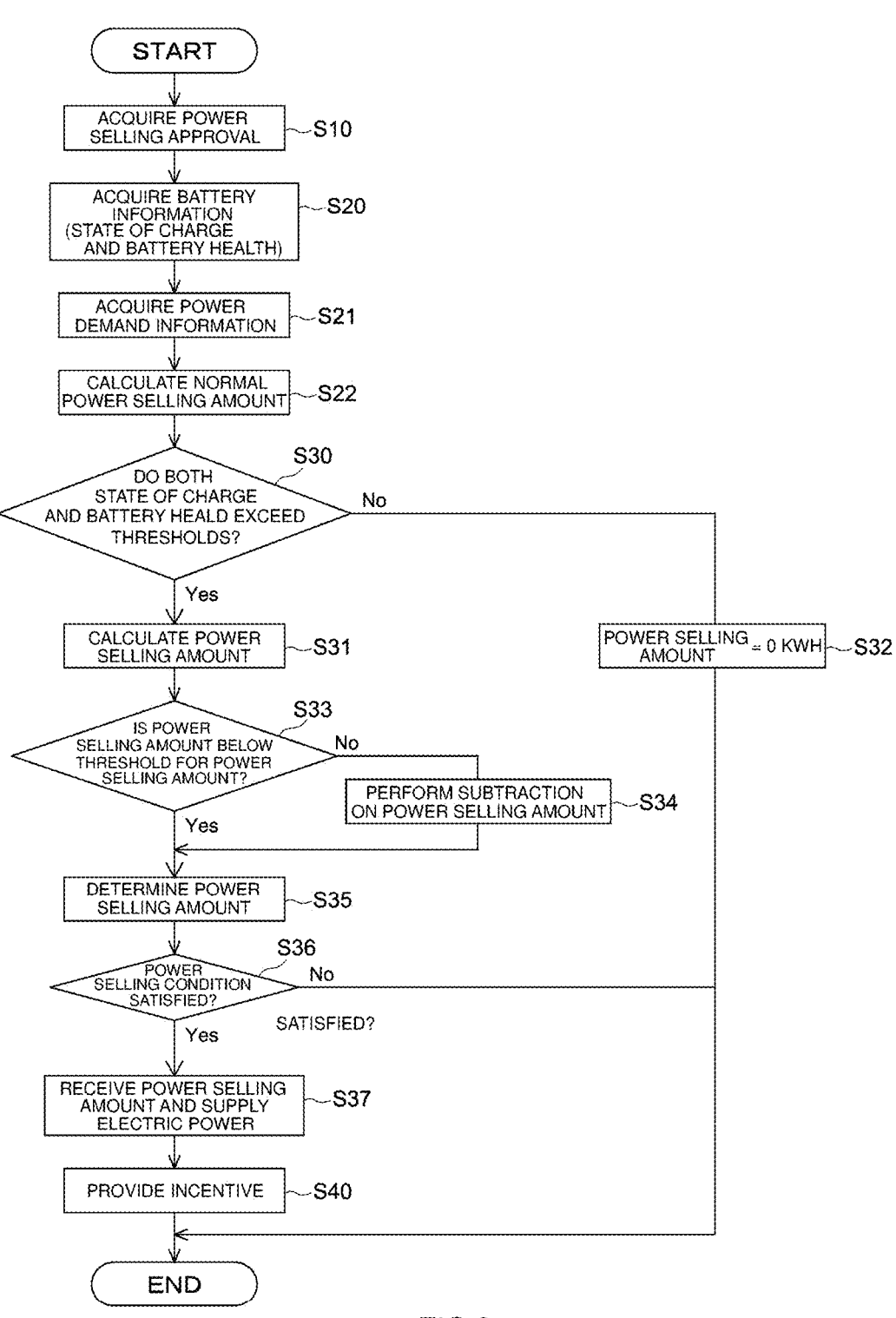
FIG. 3 is a flowchart showing a power supply/demand adjusting method according to one preferred embodiment.

Next, a method described in FIG. 2 will be more specifically described. FIG. 3 is a flowchart showing the power supply/demand adjusting method disclosed here. To achieve the power selling process according to battery information of the storage battery and power demand information, the power supply/demand adjusting method disclosed here specifically includes the following steps in steps S1 to S4 in FIG. 2.

First, in S1 in FIG. 2, step S10 below is performed. In step S10, the power supply/demand management device 100 acquires power selling approval of a storage battery from a user who wants to participate in a power selling process. The power selling approval may be transmitted from an unillustrated communication terminal of a user through the communication network 300 or may be input directly to an input/output controller 110 of the power supply/demand management device 100 described later. The acquisition time of power selling approval by the power supply/demand management device 100 is not limited, and power selling approval may be acquired at every time when each electric vehicle is electrically connected to the power supply/demand management device 100, or power selling approval of a storage battery may be previously acquired based on a prior contract, for example, and stored.

In step S10, in addition to power selling approval of a storage battery, a power selling condition may be additionally acquired. The power selling condition here is a condition in performing a power selling process on a storage battery for which power selling approval is acquired, and can be set arbitrarily by a user. Examples of the power selling condition include a power selling amount arbitrarily set by a user (hereinafter also referred to as a "set power selling amount"), an incentive grant rate desired by the user, and a time frame in which electric power can be sold from a storage battery.

The "incentive grant rate" herein is a factor used in calculating an incentive to be provided. As the incentive grant rate increases, an incentive such as money and points returned to a user increases. The incentive grant rate can be included in the power demand information.

In S2 in FIG. 2, the following steps S20 to S22 are performed. Steps S20 and S21 may be performed in any order or may be performed at the same time.

In step S20, battery information of a storage battery for which power selling approval is obtained is acquired (estimated). The battery information of the storage battery here includes at least a state of charge (SOC) and battery health of the storage battery. The "state of charge (SOC) of a storage battery" herein refers to a ratio of a remaining charge amount to a full charge capacity of the storage battery. The "battery health of a storage battery" is a value representing a deterioration degree of the storage battery. The battery health X of a storage battery may be a value calculated based on at least one of a resistance increase rate, a capacity retention rate, a temperature, years of use, or the number of charging/discharging of the storage battery, for example, and may be a value calculated based on a plurality of pieces of information concerning the state of the storage battery. More preferably, the battery health of the storage battery may be a value based on at least one of a resistance increase rate, a capacity retention rate, or a temperature of the storage battery.

A method for acquiring (estimating) battery health of a storage battery is not specifically limited. For example, battery health may be acquired (estimated) by dividing a voltage change in charging/discharging by a current value at this time based on data detected by a voltage sensor and a current sensor to estimate an internal resistance so that an initial internal resistance is subtracted from this internal resistance to calculate a resistance increase rate. The initial internal resistance of the storage battery may be a value measured in an initial state of the storage battery for which the power selling approval is acquired or an initial internal resistance acquired from a manufacturer of a similar type of a storage battery with reference to, for example, the type of the storage battery for which the power selling approval is acquired.

The method for acquiring (estimating) a state of charge (SOC) of a storage battery is not specifically limited. As an example, a voltage of a storage battery measured by a voltage sensor may be compared to acquire (estimate) an approximate value of the SOC. An open circuit voltage (OCV) refers to a voltage of a secondary battery that is not energized, and is also called an open-circuit voltage.

Battery information (state of charge and battery health) of the storage battery may be acquired (estimated) in the power supply/demand management device 100 as described above, or may be a value acquired by an electronic control unit (e.g., an ECU) mounted on a vehicle.

In step S21, power demand information is acquired from the power transmission/distribution system 200. The power demand information includes at least a required power amount (kWh). The power demand information preferably includes an incentive grant rate as well as the required power amount. The power demand information may be acquired from the input/output controller 110 of the power supply/demand management device 100 described later through the communication network 300.

In step S22, a normal power selling amount (kWh) is calculated from the power selling approval and the power demand information acquired as described above. The normal power selling amount (kWh) here is a value calculated by dividing the required power amount (kWh) acquired from the power transmission/distribution system 200 by the number of storage batteries for which power selling approval is acquired. In other words, the normal power selling amount is a power amount uniformly supplied from storage batteries for which power selling approval is acquired to the power transmission/distribution system 200 in a case where no adjustment is performed based on battery information of the storage batteries.

In S3 in FIG. 2, steps S30 to S32 and S37 are performed as follows. In steps S30 to S32, a power selling amount is calculated based on battery information of a storage battery and power demand information. In step S37, electric power based on the power selling amount is supplied from the storage battery to the power transmission/distribution system 200.

In step S30, the state of charge and battery health of a storage battery for which power selling approval are compared with predetermined thresholds. These thresholds (i.e., a threshold $a_t$ for the state of charge and a threshold $c_t$ for battery health) will now be described. As described above, in the power supply/demand management device 100 disclosed here calculates an appropriate power selling amount based on battery information (state of charge and battery health) of a storage battery. For example, in a case where battery health is very good but the state of charge is extremely low, the state of charge further degrades by performing a power selling process so that the storage battery might fail to serve as a driving source any more. To prevent this, thresholds (a threshold $a_t$ for the state of charge and a threshold $c_t$ for the battery health) are previously determined as minimum values at which a power selling process is determined to be performable, and if one of the battery health or the state of charge of the storage battery is lower than the threshold, a power selling process is stopped. That is, the threshold $a_t$ for the state of charge and the threshold $c_t$ for the battery health are set as criteria for determining whether a power selling process can be performed on a storage battery for which power selling approval or not. This configuration eliminates concerns about, for example, incapability of using an electric vehicle including a storage battery as a driving source because of a power selling process.

The threshold $a_t$ for the state of charge and the threshold $c_t$ for the battery health vary depending on the type and application of a storage battery, and thus, are not uniquely defined, and are preferably any values set with reference to a capacity retention rate at which the storage battery needs to be replaced.

Figure 4:
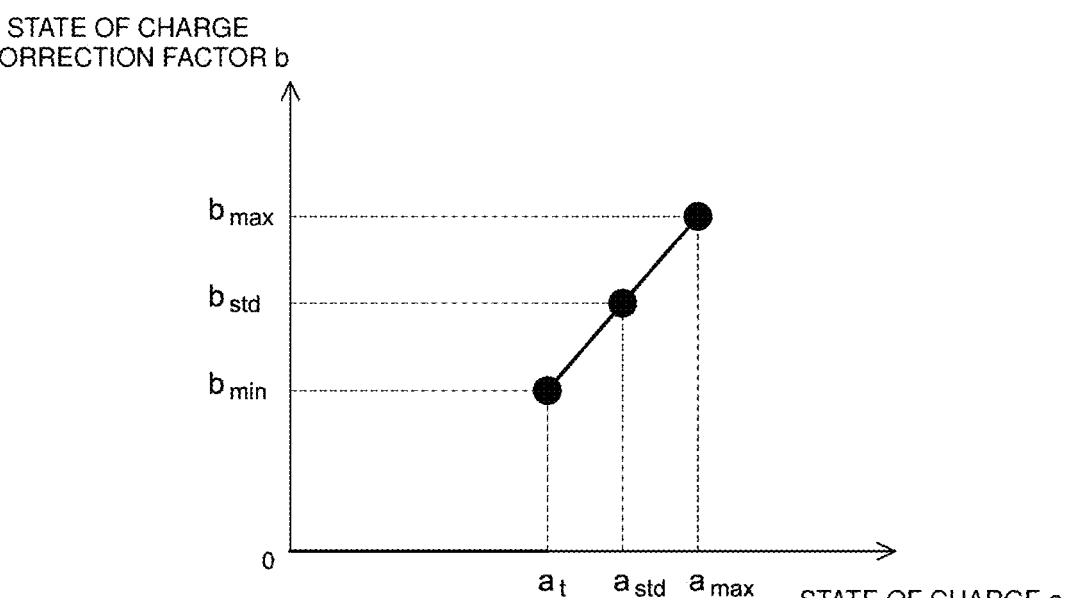
FIG. 4 shows a relationship between a state of charge a and a state of charge correction factor b according to one preferred embodiment.
Figure 5:
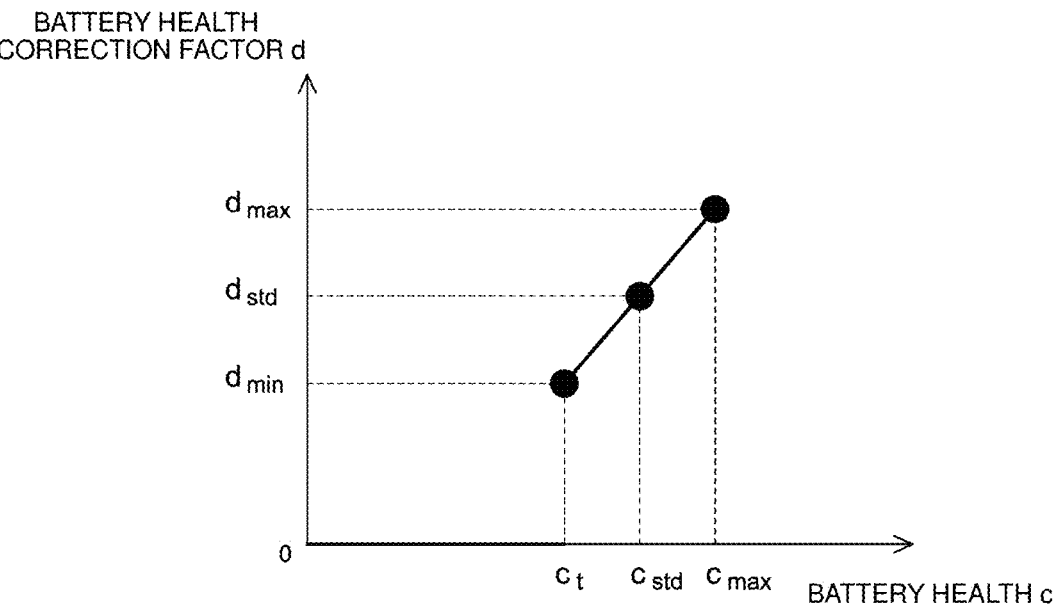
FIG. 5 shows a relationship between a battery health c and a battery health correction factor d according to one preferred embodiment.

If at least one of the state of charge or the battery health of the storage battery is below the threshold (S30: NO), the process proceeds to step S32. For example, if the state of charge of a storage battery is below the threshold $a_t$ for the state of charge, the remaining charge amount of the storage battery is extremely low, and thus, power supply from the storage battery should be stopped. Thus, as shown in FIG. 4, the state of charge correction factor b is 0. If the battery health of the storage battery is below the threshold $c_t$ for the battery health, the battery health is poor, for example, the resistance increase rate of the storage battery is very high, and thus, power supply from the storage battery should be stopped. Thus, as shown in FIG. 5, the battery health correction factor d is 0. In this manner, if at least one of the state of charge and the battery health of the storage battery is below the threshold, the power selling amount of the storage battery is calculated to be 0 (kWh). Accordingly, power supply from the storage battery is substantially stopped, and the power selling process is finished.

If both the state of charge and the battery health of the storage battery exceed the thresholds (S30: YES), the process proceeds to step S31.

In step S31, a power selling amount is calculated based on battery information (state of charge and battery health) of a storage battery for which power selling approval is acquired. The power selling amount is not specifically limited, and may be a value calculated from a product of the normal power selling amount (kWh), the state of charge correction factor b, and the battery health correction factor d, for example.

In step S31, to calculate the power selling amount, the state of charge and the battery health of the storage battery for which power selling approval is acquired are compared to their predetermined reference values. The reference values (i.e., a reference value $a_{std}$ for the state of charge and a reference value $c_{std}$ for the battery health) are set to exceed the thresholds, and set as criteria for determining whether addition or subtraction is performed on the normal power selling amount in calculating a power selling amount in storage batteries for which a power selling process exceeding the thresholds can be performed. The reference value $a_{std}$ for the state of charge and the reference value $c_{std}$ for the battery health vary depending on the type and application of a storage battery, and thus, are not uniquely defined, and are preferably any values set with reference to a remaining charge amount of a storage battery that enables an electric vehicle to travel in a distance corresponding to about 75% of a fill-charge traveling distance and a capacity retention rate at the time when a half of the lifetime of each storage battery has elapsed.

If the state of charge a of a storage battery exceeds the threshold $a_t$ for the state of charge, the state of charge correction factor b can be a value from a minimum value $b_{min}$ to a maximum value $b_{max}$, as shown in FIG. 4. If the state of charge a of a storage battery exceeds the reference value $a_{std}$, the remaining charge amount of the storage battery is especially sufficient, and thus, a power selling process exceeding the normal power selling amount is performed. Accordingly, as shown in FIG. 4, the state of charge correction factor b exceeds the reference value $b_{std}$. On the other hand, if the state of charge a of a storage battery is below the reference value $a_{std}$, the storage battery is in a state enabling power selling, but from the viewpoint of the remaining charge amount of the storage battery, an active power selling process can be suppressed. Accordingly, as shown in FIG. 4, the state of charge correction factor b is less than the reference value $b_{std}$. The reference value $b_{std}$ here is 1 (i.e., substantially equal to the normal power selling amount).

If the battery health c of a storage battery exceeds the threshold $c_t$ for the battery health, the battery health correction factor d can be from a minimum value $d_{min}$ to a maximum value $d_{max}$, as shown in FIG. 5. If the battery health c of a storage battery exceeds the reference value $c_{std}$, the state of the storage battery is especially good, and thus, a power selling process exceeding the normal power selling amount can be performed. Thus, as shown in FIG. 5, the battery health correction factor d exceeds the reference value $d_{std}$. On the other hand, if the battery health c of the storage battery is below the reference value $c_{std}$, the storage battery is in a state where electric power can be sold from the storage battery, but from the viewpoint of suppressing rapid deterioration, active power selling can be suppressed. Thus, as shown in FIG. 5, the battery health correction factor d is less than the reference value $d_{std}$. The reference value $d_{std}$ here is 1 (i.e., substantially equal to the normal power selling amount).

Specifically, the state of charge correction factor b can be calculated by Equation (1):

$$b = \frac{(b_{max} - b_{std})}{(a_{max} - a_{std})} \times (a - a_{std}) + b_{std} \qquad (1)$$

Specifically, similar to the state of charge correction factor b, the battery health correction factor d can be calculated by Equation (2):

$$d = \frac{(d_{max} - d_{std})}{(c_{max} - c_{std})} \times (c - c_{std}) + d_{std} \qquad (2)$$

In step S31, the state of charge correction factor b and the battery health correction factor d are calculated based on the state of charge and battery health of a storage battery as described above, and a power selling amount is calculated based on each correction factor and the normal power selling amount. That is, if the state of the storage battery is comprehensively determined to be especially good, a power selling amount is calculated to exceed the normal power selling amount, whereas if the state of the storage battery is comprehensively determined to be relatively poor, a power selling amount is calculated to be below the normal power selling amount. Thus, collection of a uniform amount of electric power without consideration of the state of each storage battery is not performed, and a power selling process that does not cause excessive deterioration of the storage battery is performed. Accordingly, concerns of a user especially in using the storage battery as a driving source of an electric vehicle are eliminated, and thus, the user is encouraged to participate in power supply/demand adjustment.

After the power selling amount is calculated in step S31, the process proceeds to step S37. In step S37, the power supply/demand management device 100 transmits electric power based on the power selling amount from a storage battery to the power transmission/distribution system 200. As described above, for a storage battery as a target of a power selling process, power selling approval has been acquired. Thus, the power supply/demand management device 100 disclosed here automatically receives the calculated amount of electric power based on the power selling approval. Then, the power supply/demand management device 100 transmits the electric power to the power transmission/distribution system 200.

In S3 in FIG. 2, steps S33 to S36 below may be performed as additional steps. Only steps S33 to S35 may be performed as additional steps, or only step S36 may be performed as an additional step. Alternatively, all the steps S33 to S36 may be performed as additional steps.

In step S33, the power selling amount calculated in step S31 is compared with a predetermined threshold for the power selling amount. The threshold for the power selling amount here is a criterion for determining whether the power selling amount calculated as described above is within an appropriate range or not. For example, since the normal power selling amount is a value obtained by dividing the required power amount acquired from the power transmission/distribution system 200 by the number of storage batteries for which power selling approval is acquired as described above, if the number of storage batteries for which power selling approval is acquired is small, an excessively large value can be calculated as a normal power selling amount. Thus, in a case where a power selling amount is calculated based on the normal power selling amount and each correction factor, an excessively large power selling amount can be calculated. Providing such an excessively large power selling amount to a storage battery is not reasonable, and thus, a threshold for the power selling amount is preferably set as a maximum possible power selling amount from the storage battery.

The threshold for the power selling amount may be a value set in the power supply/demand management device 100, or may be a set power selling amount set by a user as a power selling condition. By employing the set power selling amount as the threshold for the power selling amount, it is possible to prevent transmission of electric power in an amount not intended by a user from a storage battery.

If the calculated power selling amount is smaller than the threshold for the power selling amount (S35: YES), the calculated power selling amount is determined to be within an appropriate range and the process proceeds to step S35, where a power selling amount is determined.

On the other hand, if the calculated power selling amount is larger than the threshold for the power selling amount (S33: NO), the process proceeds to step S34. In step S34, the calculated power selling amount is reduced to at least the threshold for the power selling amount. The power selling amount only needs to be reduced to at least the threshold for the power selling amount. For example, the power selling amount may be reduced to a value smaller than the threshold for the power selling amount (e.g., to a value about 70% to 99% of the threshold for the power selling amount).

In step S36, it is determined whether the power selling condition that is set by the user and can be acquired in step S10 is satisfied or not. If the power selling condition set by the user is satisfied (S36: YES), the process proceeds to step S37.

If the power selling condition set by the user is not satisfied (S36: NO), the power selling process is finished. That is, even with power selling approval, if the power selling condition set by the user is not satisfied, the power selling process is stopped. In this manner, it is possible to prevent execution of a power selling process in a condition not intended by the user.

In S4 in FIG. 2, step S40 is performed as follows. In step S40, an incentive according to a power selling amount is provided to a user of a storage battery. The incentive may be calculated from the power selling amount and an incentive grant rate, for example. The method for providing the incentive is not specifically limited, and for example, points or the lime may be provided to communication terminals of users through the communication network 300.

With the power supply/demand adjusting method described above, an appropriate power selling amount is calculated based on battery information (state of charge and battery health) of a storage battery for which power selling approval is acquired, and power demand information from the power transmission/distribution system 200. In addition, the threshold for the power selling amount in is set in order to prevent selling of an excessively large power selling amount. Accordingly, a power selling process that rapidly deteriorates a storage battery is prevented. Furthermore, it is determined whether the power selling condition set by the user is satisfied or not. Accordingly, a power selling process not intended by a user is prevented. Such a power supply/demand adjusting method eliminates concerns of the user, and thus, the user can be encouraged to participate in power supply/demand adjustment.

Figure 6:
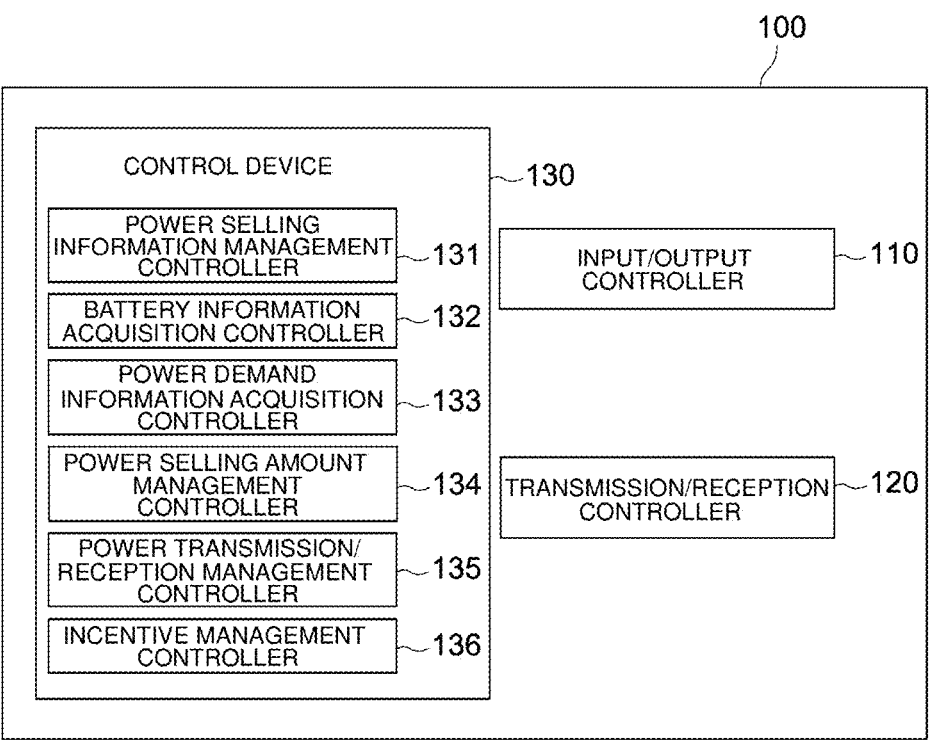
FIG. 6 schematically illustrates an example of a configuration of a power supply/demand management device according to one preferred embodiment.

Next, an example of a specific configuration of the power supply/demand management device 100 for achieving the process described with reference to FIGS. 2 and 3 will be described. FIG. 6 generally illustrates the configuration of the power supply/demand management device 100. As illustrated in FIG. 6, the power supply/demand management device 100 includes an input/output controller 110 capable of acquiring predetermined information from the outside and providing the information to the outside, a transmission/reception controller 120 electrically connecting electric vehicles to the power transmission/distribution system 200, and a control device 130 that controls a power supply process to achieve power supply and demand adjustment between the power transmission/distribution system 200 and the storage batteries mounted on each electric vehicle.

The input/output controller 110 generally refers to equipment configured to acquire predetermined information from the outside and provide the predetermined information to the outside. Although not specifically limited, the input/output controller 110 may perform bidirectional communication through the communication network 300. For example, the input/output controller 110 may be connected to the communication network 300 (see FIG. 1) through, for example, a communication service provided by a mobile communication provider. The input/output controller 110 may include an unillustrated display screen such as a display device, and an input controller such as a touch panel.

The transmission/reception controller 120 generally refers to equipment electrically connecting the electric vehicles 50, 52, and 54 to the power transmission/distribution system 200. The transmission/reception controller 120 includes, for example, power plugs to which the electric vehicles 50, 52, and 54 can be electrically connected through the electric wires 31, 32, and 33 (see FIG. 1). The transmission/reception controller 120 receives electric power from the storage batteries mounted on the electric vehicles and transmits electric power to the power transmission/distribution system 200 based on a signal from the control device 130. The transmission/reception controller 120 may also incorporate a battery capable of storing electric power therein.

The control device 130 controls a power supply process to thereby achieve power supply and demand adjustment between the power transmission/distribution system 200 and the storage batteries mounted on the electric vehicles. The control device 130 generally refers to equipment that performs information processing in the power supply/demand management device 100. The control device 130 may be constituted by a computation device stored in the power supply/demand management device 100. The computation device is constituted by, for example, a microcomputer. A hardware configuration of the microcomputer may include, but is not limited to, a read only memory (ROM) storing a program for control, a central processing unit (CPU) capable of executing the program, a random access memory (RAM) used as a working area where the program is developed, a memory device such as a memory for storing the program and various types of data, and input and output ports, for example. The control device 130 receives an output signal from the input/output controller 110 through the input port. The control device 130 acquires predetermined information based on an output signal from the input/output controller 110.

The control device 130 may not be a computation device physically stored in the power supply/demand management device 100. For example, in a case where the power supply/demand management device 100 is connected to an external computer to enable data communication through a LAN cable or the Internet, for example, the external computer may serve as the control device 130 of the power supply/demand management device 100 to control power supply and demand. Processing of the control device 130 may be performed by a plurality of computers in cooperation. For example, a computation device in the power supply/demand management device 100 may process information stored in, for example, a server on a network to control power supply and demand. Alternatively, processing to be executed by the control device 130 may be performed by a computation device in the power supply/demand management device 100 and an external compute in cooperation. The "external computer" herein may be a control device attached to a target storage battery. In a case where a storage battery is mounted on a vehicle, for example, an electronic control unit (e.g., an ECU) of the vehicle may be used as a part of the control device 130. The ECU of the vehicle can function as a battery information acquisition controller 132.

The power supply/demand management device 100 includes a power selling information management controller 131, the battery information acquisition controller 132, a power demand information acquisition controller 133, a power selling amount management controller 134, a power transmission/reception management controller 135, and an incentive management controller 136. The configuration illustrated in FIG. 6 includes these components as a part of the function of the control device 130.

The power selling information management controller 131 is configured or programmed to manage power selling information acquired from the outside. The power selling information management controller 131 acquires and stores information necessary for managing a power selling process of a storage battery. Examples of the information necessary for managing a power selling process of a storage battery include power selling approval, a set power selling amount, a desired incentive grant rate, a storage battery from which electric power is sold, the type of the storage battery, personal information such as the name and address of a user, and current positional information of the user. The power selling information may be input by user's operation of, for example, the input controller of the input/output controller 110 described above, or may be transmitted from, for example, a communication terminal of the user through the communication network 300. The power selling information management controller 131 may provide a storage battery ID (identifier) for each storage battery for which a power selling approval is acquired to create an approved power selling process list.

The battery information acquisition controller 132 is configured or programmed to acquire (estimate) battery information of a storage battery for which the power selling approval is acquired. The battery information acquisition controller 132 acquires at least the state of charge (SOC) and battery health of a storage battery as the battery information of the storage battery.

The battery health of the storage battery may be calculated from a resistance increase rate, for example. For example, examples of the method for acquiring an internal resistance of a storage battery include a method for acquiring an internal resistance of a storage battery by dividing a voltage change in charging/discharging the storage battery by a change of a current value at this time based on various types of data detected by a voltage sensor and a current sensor (i.e., a method of linearly approximating a parameter of a current change amount and a parameter based on a voltage change amount and an impedance change amount and calculating a slope of the approximated line as an impedance of the storage battery). An initial internal resistance of the storage battery is subtracted from the thus-obtained internal resistance of the storage battery, thereby calculating a resistance increase rate of the storage battery.

The battery information of a storage battery may be acquired (estimated) by the battery information acquisition controller 132, or may be a value acquired (estimated) by an electronic control unit (e.g., an ECU) of each electric vehicle. The battery information acquisition controller 132 stores battery information (state of charge and battery health) of each storage battery in the approved power selling process list created as described above in association with the storage battery ID, for example.

The power demand information acquisition controller 133 is configured or programmed to acquire power demand information from the power transmission/distribution system 200. The power demand information can be, for example, a required power amount (kWh), an incentive grant rate, a time frame in which electric power is to be supplied, and positional information of the power transmission/distribution system 200. The power demand information can be acquired from the input/output controller 110.

The power selling amount management controller 134 is configured or programmed to calculate a power selling amount (kWh) based on the acquired battery information of a storage battery and power demand information. As information necessary for calculating the power selling amount, the number of storage batteries for which power selling approval is acquired, the battery health of storage batteries, the states of charge (SOC) of storage batteries, and a required power amount, for example, are input. The method for calculating the power selling amount has been specifically described above.

The power transmission/reception management controller 135 is configured or programmed to manage power transmission/reception between each storage battery and the power transmission/distribution system 200. The power transmission/reception management controller 135 receives information necessary for managing the amount of received/transmitted power, such as a required power amount from the power transmission/distribution system 200, and the calculated power selling amount. Then, the power transmission/reception management controller 135 outputs information to the transmission/reception controller 120 such that electric power based on the calculated power selling amount is transmitted from the storage battery to the power transmission/distribution system 200. The transmission/reception controller 120 receives a power amount based on the information from the storage battery, and transmits electric power to the power transmission/distribution system 200.

The incentive management controller 136 is configured or programmed to calculate an incentive to be provided to a user of each storage battery based on the power selling amount. As information for calculating an incentive, the incentive management controller 136 receives, for example, the power selling amount and the incentive grant rate. The incentive management controller 136 calculates an incentive based on the information, and transmits information concerning this incentive to the input/output controller 110. Then, the input/output controller 110 provides an incentive to the user through the communication network 300, for example.

The power supply/demand management device 100 with the configuration describe above can achieve the power supply/demand process described with reference to FIGS. 2 and 3. The configuration described above shows one example of the specific configuration of the power supply/demand management device 100 disclosed here, and the present disclosed is not limited to this configuration. The input/output controller 110 and the transmission/reception controller 120 may be constituted by controllers including alternative functions.

The power supply/demand management device 100 configured as described above acquires battery information (state of charge and battery health) of a storage battery and power demand information based on power selling approval of the storage battery, and calculates an appropriate power selling amount based on the information. Then, electric power based on the calculated power selling amount is automatically transmitted from the storage batteries 10, 12, and 14 to the power transmission/distribution system 200. This power supply/demand management device 100 eliminates an inconvenience of a user of a storage battery in monitoring information on selling electric power and determining whether to participate in power supply/demand adjustment. In addition, since an appropriate power selling process according to the state of each storage battery is performed, concerns about excessive deterioration of a storage battery caused by a power selling process can be eliminated. Accordingly, participation of a user in power supply/demand adjustment can be encouraged.

Specific examples of the present disclosure have been described in detail hereinbefore, but are merely illustrative examples, and are not intended to limit the scope of claims. The techniques described in claims include various modifications and changes of the above exemplified specific examples.

What is claimed is:

1. A power supply/demand management device configured or programmed to manage power supply and demand between a power transmission/distribution system and a storage battery mounted on an electric vehicle, the device comprising:

a power selling information management controller configured or programmed to acquire power selling approval of electric power stored in the storage battery;

a battery information acquisition controller configured or programmed to acquire battery information of a storage battery for which the power selling approval is acquired, the battery information including at least a state of charge or battery health of the storage battery;

a power demand information acquisition controller configured or programmed to acquire power demand information from the power transmission/distribution system;

a power selling amount management controller configured or programmed to calculate a power selling amount to be supplied from the storage battery to the power transmission/distribution system, based on the battery information acquired by the battery information acquisition controller and the power demand information acquired by the power demand information acquisition controller;

a power transmission/reception management controller configured or programmed to transmit electric power based on the power selling amount from the storage battery to the power transmission/distribution system; and an incentive management controller configured or programmed to calculate an incentive to be provided to a user of the electric vehicle based on the power selling amount, wherein the power selling amount management controller is further configured or programmed to:

the power selling amount management controller stores a predetermined threshold for each of the battery health and the state of charge, each of the battery health and the state of charge of the storage battery acquired by the battery information acquisition controller is compared with the predetermined threshold, and if at least one of the battery health or the state of charge of the storage battery is less than the predetermined threshold, the power selling amount is calculated to be zero, and the transmission of electric power from the storage battery is inhibited, and wherein, if the state of charge and the battery health of the storage battery are not less than the respective predetermined threshold, compare the calculated power selling amount with a predetermined threshold for the power selling amount, and if the calculated power selling amount exceeds the threshold for the power selling amount, reduce the calculated power selling amount at least to the predetermined threshold, wherein the predetermined threshold for the power selling amount is a predetermined maximum amount for protecting the storage battery, and transmit electric power based on the power selling amount.

2. The power supply/demand management device according to claim 1, wherein the power selling information management controller is further configured or programmed to acquire a power selling condition set by a user of the electric vehicle in addition to the power selling approval, and wherein the power selling amount management controller is further configured or programmed to determine whether the power selling condition is satisfied, and to control the transmission of electric power only if the power selling condition is satisfied, to stop the transmission of electric power if the power selling condition is not satisfied.

* * * * *